(12) United States Patent
Rekonen et al.

(10) Patent No.: US 7,592,285 B2
(45) Date of Patent: Sep. 22, 2009

(54) METHOD FOR PREPARING AN OLEFIN POLYMERIZATION CATALYST COMPOSITION

(75) Inventors: Petri Rekonen, Porvoo (FI); Pauli Leskinen, Helsinki (FI)

(73) Assignee: Borealis Technology OY, Porvoo (FI)

( * ) Notice: Subject to any disclaimer, the term of this patent is extended or adjusted under 35 U.S.C. 154(b) by 0 days.

(21) Appl. No.: 10/561,016

(22) PCT Filed: Jun. 7, 2004

(86) PCT No.: PCT/EP2004/006132

§ 371 (c)(1),
(2), (4) Date: Mar. 12, 2008

(87) PCT Pub. No.: WO2005/003191

PCT Pub. Date: Jan. 13, 2005

(65) Prior Publication Data

US 2008/0167434 A1 Jul. 10, 2008

(30) Foreign Application Priority Data

Jun. 20, 2003 (EP) .................... 03013935

(51) Int. Cl.
*C08F 4/60* (2006.01)
*C08F 4/6192* (2006.01)
*B01J 31/00* (2006.01)

(52) U.S. Cl. .............. 502/107; 502/104; 502/109; 502/115; 502/152; 526/124.3; 526/160

(58) Field of Classification Search ............ 502/107, 502/162, 163, 104, 109, 115, 152; 526/124.2, 526/160
See application file for complete search history.

(56) References Cited

U.S. PATENT DOCUMENTS

| | | | |
|---|---|---|---|
| 4,517,307 | A | 5/1985 | Cuffiani et al. |
| 5,188,999 | A | 2/1993 | Duranel et al. |
| 5,641,721 | A | 6/1997 | Pentti et al. |
| 6,316,562 | B1 | 11/2001 | Munck et al. |
| 6,906,153 | B2 | 6/2005 | Blom et al. |

FOREIGN PATENT DOCUMENTS

| | | |
|---|---|---|
| EP | 0 083 074 A1 | 7/1983 |
| EP | 0 129 368 A1 | 12/1984 |
| EP | 0 260 130 A1 | 3/1988 |
| EP | 0 423 101 A3 | 4/1991 |
| EP | 0 537 130 A1 | 4/1993 |
| EP | 1 273 595 A1 | 1/2003 |
| EP | 1 323 747 A1 | 7/2003 |
| WO | WO 96/13529 A1 | 5/1996 |
| WO | WO 97/10248 A1 | 3/1997 |
| WO | WO 97/28170 A1 | 8/1997 |
| WO | WO 98/46616 A1 | 10/1998 |
| WO | WO 98/49208 A1 | 11/1998 |
| WO | WO 98/56831 A1 | 12/1998 |
| WO | WO 99/10353 A1 | 3/1999 |
| WO | WO 99/12981 A1 | 3/1999 |
| WO | WO 99/19335 A1 | 4/1999 |
| WO | WO 99/41290 A1 | 8/1999 |
| WO | WO 00/34341 A3 | 6/2000 |
| WO | WO 01/70395 A2 | 9/2001 |
| WO | WO 01/70395 A3 | 9/2001 |
| WO | WO 02/060963 A1 | 8/2002 |
| WO | WO 03/000754 A1 | 1/2003 |
| WO | WO 03/000757 A1 | 1/2003 |

OTHER PUBLICATIONS

Boor, Jr., John, "Ziegler-Natta Catalysts and Polymerizations", Academic Press, 1979, pp. 180-185.
Periodic Table, IUPAC, Nomenclature of Inorganic Chemistry, 2003 and 2005.
Gibson, V.C. et al., "The Search for New-Generation Olefin Polymerization Catalysts: Life Beyond Metallocenes", Angew. Chem. Int. Ed., 1999, vol. 38, 428-447.
Endres, A. et al., "Die Fluorige Phase: Organische Chemie mit Hochfluorierten Reagenzien und Losungsmitteln," Chemie in Unserer Zeit, 34(6), 382-393, 2000.
Pierandrea Lo Nostro, "Phase Separation Properties of Fluorocarbons, Hydrocarbons and Their Copolymers", Advances in Colloid and Interface Science, vol. 56, 1995, 245-287, Elsevier Science, B.V.

*Primary Examiner*—Caixia Lu
(74) *Attorney, Agent, or Firm*—McDonnell Boehnen Hulbert & Berghoff LLP

(57) ABSTRACT

The present invention provides for a method for preparing a storable fluidic olefin polymerisation catalyst composition, said catalyst comprising an organometallic compound of a transition metal of Group 3 to 10 of the Periodic Table (IUPAC), or of an actinide or lanthanide, and the use of such composition for polymerising α-olefins.

40 Claims, No Drawings

METHOD FOR PREPARING AN OLEFIN POLYMERIZATION CATALYST COMPOSITION

The present invention relates to a method for preparing a storable fluidic olefin polymerisation catalyst composition and the use of said composition for polymerising olefins.

BACKGROUND OF THE INVENTION

Catalyst systems, which are solutions of one or more catalyst components (e.g. a transition metal compound and optionally a cocatalyst) are known in the field as homogeneous catalyst systems. Homogeneous systems are used as liquids in the polymerisation process. Such systems have in general a satisfactory catalytic activity, but their problem has been that the polymer thus produced has a poor morphology (e.g. the end polymer is in a form of a fluff having a low bulk density). As a consequence, operation of slurry and gas phase reactors using a homogeneous catalyst system cause problems in practice as i.a. fouling of the reactor can occur.

In the patent publications WO03/000757, WO03/000754 and European Patent Application No. 01660238.5 from the same applicant, the above mentioned problem has been overcome by introducing a new process for producing Ziegler-Natta (ZN) or Single-Site-catalyst (SSC) components, in which the catalyst is formed in a dispersed phase containing the preponderance of the reactive compounds of a produced oil-in-oil emulsion and subsequently this dispersed phase being solidified, e.g. by heating, to provide the respective catalyst component.

The particle size of the catalyst particles described in the above applications can be controlled by the size of the droplets of the dispersed phase, and spherical particles with an uniform particle size distribution can be obtained.

Therefore, these catalyst components have excellent morphology and good particle size distribution and the polymer particles produced by using this catalysts have very good morphology properties, too.

However, the methods for preparing the catalysts described in the above applications usually require a washing step followed by drying the washed catalyst components. After settling and siphoning the washed solids were dried, for instance by evaporation or flushing with nitrogen at elevated temperatures. This drying step can reveal significant disadvantage, as the catalyst yield might be decreased while the catalyst tends to stick in the catalyst dryer and thus a significant part of the catalyst might be lost. Furthermore, catalyst yield might also be decreased as portions of the catalyst could be left inside the reactor after preparation. Not to mention, that the drying step in such a procedure is a very critical step, during which the catalyst morphology will be deteriorated, i.e. the good catalyst particle morphology obtained in the preparation procedure will always be destroyed to some extent during the drying step, which in turn has undesired effects on the polymerisation procedure. In addition catalyst activity might be decreased a lot, and furthermore, the drying step needs of course time and causes additional costs. Still one disadvantage relates to the activity losses of the dried catalysts during the catalyst storage.

Therefore, an improved method for preparing catalyst component is required in order to increase yield, to keep or even improve the catalyst morphology, to at least maintain or even increase the catalytic activity during the whole preparation procedure. Further the improved method is needed to decrease preparative effort and time on one side and, on the other side to reduce the production costs for the catalyst, and finally to reduce catalyst activity losses during the storage and difficulties during transportation.

The inventors have surprisingly found that, when preparing an olefin polymerisation catalyst component by using a fluidic isolation medium, such as oil-like fluid, the drying step for the catalyst particles after the washing procedure can be avoided, whereby a homogenous olefin polymerisation catalyst component in a form of a fluidic slurry can be obtained, which is as such ready for use.

The use of oils or waxes e.g. as a catalyst carrier in a catalyst preparation process is known in the prior art. However, said oils or waxes are to be very viscous and are used for making feeding of the catalyst into the polymerisation process much more easier. The catalyst itself is produced according to an usual manner, i.e. the processes comprise always the drying step, which can now, according to the present invention, be avoided.

Other uses of oils are described, for instance in U.S. Pat. No. 5,641,721, which discloses a method, in which a viscous oil or a wax is used in a process wherein a supported procatalyst composition is pre-polymerised with a monomer in a viscous substance to produce a supported pre-polymerised wax catalyst composition. According to an important object of said application, the viscosity of the used medium (oil or wax) has to be so high that the negative effect of settling can be avoided. Further, in EP 0083074, an oil is used to form dispersions or emulsions of liquid catalyst compositions.

However, none of said references deal with the use of a fluidic medium for isolation of Ziegler-Natta or Single-Site-catalysts prepared by an emulsion method without using any external carrier in subsequent treatment for prepared catalyst particles after the washing step and for improving the catalyst properties and its preparation process. None of the references above disclose a method where use of fluidic isolation medium is part of the catalyst preparation method, in which method there is no need to isolate the catalyst as dry catalyst powder or catalyst product. This means that the critical drying step, which has many negative effects on catalyst properties, can be avoided. Furthermore, in contrast to the prior art, settling of the prepared catalyst particles causes no harm in the present invention, it could be even desired.

Details of the present invention will be discussed more precisely below.

DESCRIPTION OF THE INVENTION

The invention is based on the finding that for a homogeneous catalyst system containing an organometallic compound of a transition metal that can be converted, in a controlled way, to solid, uniform catalyst particles by first forming a liquid/liquid two-phase emulsion system, which comprises, as the dispersed phase, said solution of the homogeneous catalyst system, and as the continuous phase a solvent immiscible therewith, and then solidifying said dispersed droplets to form solid particles comprising the said catalyst, where the drying step of the catalyst components can be avoided by using a fluidic isolation medium, for example an oil or a hydrocarbon mixture for up-taking the catalyst particles. Isolation of the catalyst by slurrying the non-dried catalyst particles in said fluidic isolation medium leads to an improved morphology and consistent product composition, as well as to a shortened preparation time and lower preparation costs, due to the fact that the drying step is avoided totally. In addition the present method allows to simplify the washing procedure, i.e. less washing steps with less washing medium are required. It is also possible that the washing of the catalyst particles can be done at least partly with the same fluidic medium as is used as the isolation medium.

It has also been now unexpectedly found, that the use of a fluidic isolation medium simplifies the catalyst isolation which leads to increased yields and improved catalyst properties.

Usually, the catalyst particles are dried in a manner known in the art to remove any solvent present in the particles before use in the polymerisation step. This drying procedure can be done by evaporation or flushing with nitrogen at elevated temperatures in a separate drying vessel. When using said drying step of the prior art, the yield is often decreased, as a noticeable amount of the catalyst is left inside the reactor after preparation, and the catalyst also tends to stick in the catalyst dryer. Therefore, a considerable amount of the catalyst is lost, which can be fully avoided by the inventive process here.

In addition, a practical benefit of the invention is that by using the fluidic isolation medium and due to the obtained oil/catalyst mixture the catalyst can be easily transported as transport class of oils. It should further be mentioned that settling of the catalyst particles in the fluidic isolation medium e.g. during storage and/or transportation leads to no deterioration in catalyst properties and morphology.

Therefore, the present invention provides a method for preparing a storable fluidic olefin polymerisation catalyst composition, said catalyst comprising an organometallic compound of a transition metal of Group 3 to 10 of the Periodic Table (IUPAC), or of an actinide or lanthanide, said method comprising (a) forming a liquid/liquid emulsion system, which contains a homogeneous solution of at least one catalyst component, said solution being dispersed in a solvent immiscible therewith and forming the dispersed phase of the liquid/liquid emulsion system,
(b) solidifying said dispersed droplets to form solid catalyst particles having a predetermined size range,
(c) removing the immiscible solvent from the reaction mixture in order to obtain said solid catalyst particles;
(d) adding a fluidic isolation medium to the solid catalyst particles, said isolation medium being inert with respect to the catalyst particles and under the conditions of the olefin polymerisation, and stirring the mixture, to obtain a storable fluidic olefin polymerisation catalyst composition.

The term "catalyst component" as used herein includes, in addition to said transition metal compound, also any additional cocatalyst(s) (e.g. additional transition metal compounds) and/or activators and/or poison scavengers and/or any reaction product(s) of a transition compound(s) and a cocatalyst(s). Thus the catalyst may be formed in situ from the catalyst components in said solution in a manner known in the art.

The present invention is well suitable for preparation of Ziegler-Natta (ZN) or Single-Site-catalyst (SSC) compositions for polymerising α-olefins having 2 to 10 carbon atoms, especially for polymerising propylene or ethylene optionally with co-monomers.

A preferred process for producing an ZN olefin polymerisation catalyst component in the form of particles having a predetermined size range comprises preparing a solution of a complex of a Gp 2 metal and an electron donor by reacting a compound of said metal with said electron donor or a precursor thereof in an organic liquid reaction medium; reacting said complex, in solution, with a compound of a transition metal to produce an emulsion the dispersed phase of which contains more than 50 mol % of the Gp 2 metal in said complex; maintaining the particles of said dispersed phase within the average size range 5 to 200 µm by agitation in the presence of an emulsion stabilizer and solidifying said particles; and recovering, optionally washing said particles to obtain said catalyst component. Said ZN catalyst particles can then be slurried in said isolation medium. In a preferred method a turbulence minimising agent (TMA) is added into the reaction mixture before solidifying the droplets, which leads to more uniform grain formation due to a minimisation of turbulences in the reaction mixture.

Most probably, the mixing energy is better distributed into the emulsion when using the TMA. Furthermore an interaction of the TMA with the surface of the grain, leading to a size limitation of the grain is probably one mechanism of said TMA.

Reaction mixture here means the solution from the initial organic liquid reaction medium, over the solution of the complex up to the emulsion before solidifying the particles of the dispersed phase of the emulsion. Preferably, the TMA is added to the reaction mixture when the emulsion is formed. Experiments of the inventors have shown that the TMA has to be added to the reaction mixture in any case before solidification of the droplets of the dispersed phase starts in order to make sure that a quite uniform particle size distribution can be obtained.

Said TMA agent has to be inert under the reaction conditions and soluble in the reaction mixture under the reaction conditions, which means that preferably polymers without polar groups are preferred.

Accordingly, said TMA or mixtures thereof are preferred as polymers having linear aliphatic carbon backbone chains, which might be branched with short side chains only in order to serve for uniform flow conditions when stirring. Said TMA is in particular preferably selected from α-olefin polymers having a high molecular weight of MW about $1-40\times10^6$, or mixtures thereof. Especially preferred are polymers of α-olefin monomers with 6 to 20 carbon atoms, most preferable is polydecene.

In more detail, the turbulence minimizing agent is preferably selected from the group consisting of inert poly($C_6$-$C_{20}$)-olefines or mixtures thereof, and more preferably from polyoctene, polynonene, polydecene, polyundecene or polydodecene or mixtures thereof, having the molecular weight and general backbone structure as defined before.

Usually, said turbulence minimizing agent can be added in any process step before particle formation starts, i.e. commonly before or at the latest before solidification of the emulsion, and is added to the emulsion in an amount of 1 to 1.000 ppm, preferably 5 to 100 ppm and more preferable 5 to 50 ppm, based on the total weight of the reaction mixture.

For said ZN catalyst particles, the compound of a transition metal is preferably a compound of a Group 4 metal. The Group 4 metal is preferably titanium, and its compound to be reacted with the complex of a Gp 2 is preferably a halide. In a further embodiment of the invention a compound of a transition metal used in the process can also contain organic ligands typically used in the field known as a single site catalysts. In a still further embodiment of the invention a compound of a transition metal can also be selected from Group 5 metals, Group 6 metals, Cu, Fe, Co, Ni and/or Pd. The complex of the Group 2 metal is preferably a magnesium complex. The inventive process is particularly preferred for a process for the preparation of a Ziegler-Natta type catalyst.

A preferred embodiment of the invention first makes use of a process for producing catalysts of the Ziegler-Natta type, in the form of particles having a predetermined size range, comprising:

preparing a solution of magnesium complex by reacting an alkoxy magnesium compound and an electron donor or precursor thereof in a $C_6$-$C_{10}$ aromatic liquid reaction medium;

reacting said magnesium complex with a compound of at least one fourvalent Gp 4 metal at a temperature greater than 10° C. and less than 60° C., to produce an emulsion of a denser, $TiCl_4$/toluene-insoluble, oil dispersed phase having Gp 4 metal/Mg mol ratio 0.1 to 10 in an oil disperse phase having Gp 4 metal/Mg mol ratio 10 to 100;

maintaining the droplets of said dispersed phase within the size range 5 to 200 μm by agitation in the presence of an emulsion stabilizer and adding a turbulence minimising agent (TMA) while heating the emulsion to solidify said droplets;

and recovering, optionally washing and slurrying the solidified particles with the fluidic isolation medium to obtain said fluidic olefin polymerisation catalyst component.

More generally, the Ziegler-Natta type catalyst component in the form of particles having a predetermined size range, is prepared from a solution of a magnesium complex and an electron donor in an $C_6$ to $C_{10}$ aromatic liquid reaction medium or a mixture of $C_6$ to $C_{10}$ aromatic and $C_5$ to $C_9$ aliphatic hydrocarbons by reacting it with a compound of at least one fourvalent Group 4 metal to produce an emulsion and solidifying the formed particles of the dispersed phase by heating.

In another embodiment, the present invention is also well suitable for preparation of a fluidic olefin polymerisation catalyst component comprising SSC-particles.

Said SSC-catalyst-component includes any metallocene or non-metallocene compound of a transition metal which bears at least one organic (coordination) ligand and exhibits the catalytic activity alone or together with a cocatalyst. The transition metal compounds are well known in the art and the present invention covers e.g. compounds of metals from Group 3 to 10, e.g. Group 3 to 7, or 3 to 6, such as Group 4 to 6 of the Periodic Table, (IUPAC, Nomenclature of Inorganic Chemistry, 1989), as well as lanthanides or actinides.

Accordingly, said organotransition metal compound may have the following formula I:

wherein M is a transition metal as defined above and each X is independently a monovalent anionic ligand, such as a σ-ligand, each L is independently an organic ligand which coordinates to M, R is a bridging group linking two ligands L, m is 1, 2 or 3, n is 0, 1 or 2, preferably 0 or 1, q is 1, 2 or 3, and m+q is equal to the valency of the metal.

In a more preferred definition, each L is independently (a) a substituted or unsubstituted cyclopentadiene or a mono-, bi- or multifused derivative of a cyclopentadiene which optionally bear further substituents and/or one or more hetero ring atoms from a Group 13 to 16 of the Periodic Table (IUPAC); or (b) an acyclic, $\eta^1$- to $\eta^4$- or $\eta^6$-ligand composed of atoms from Groups 13 to 16 of the Periodic Table, and in which the open chain ligand may be fused with one or two, preferably two, aromatic or non-aromatic rings and/or bear further substituents; or (c) a cyclic σ-, $\eta^1$- to $\eta^4$- or $\eta^6$-, mono-, bi- or multidentate ligand composed of unsubstituted or substituted mono-, bi- or multicyclic ring systems selected from aromatic or non-aromatic or partially saturated ring systems, and containing carbon ring atoms and optionally one or more heteroatoms selected from Groups 15 and 16 of the Periodic Table.

By "σ-ligand" is meant a group bonded to the metal at one or more places via a sigma bond.

According to an embodiment of SSC particles preferred here, said organotransition metal compound (I) is a group of compounds known as metallocenes. Said metallocenes bear at least one organic ligand, generally 1, 2 or 3, e.g. 1 or 2, which is η-bonded to the metal, e.g. a $\eta^{2-6}$-ligand, such as a $\eta^5$-ligand. Preferably, a metallocene is a Group 4 to 6 transition metal, suitably titanocene, zirconocene or hafnocene, which contains at least one $\eta^5$-ligand, which is e.g. an optionally substituted cyclopentadienyl, an optionally substituted indenyl, an optionally substituted tetrahydroindenyl or an optionally substituted fluorenyl.

The metallocene compound may have a formula II:

wherein each Cp independently is an unsubstituted or substituted and/or fused homo- or heterocyclopentadienyl ligand, e.g. substituted or unsubstituted cyclopentadienyl, substituted or unsubstituted indenyl or substituted or unsubstituted fluorenyl ligand; the optional one or more substituent(s) being selected preferably from halogen, hydrocarbyl (e.g. C1-C20-alkyl, C2-C20-alkenyl, C2-C20-alkynyl, C3-C12-cycloalkyl, C6-C20-aryl or C7-C20-arylalkyl), C3-C12-cycloalkyl which contains 1, 2, 3 or 4 heteroatom(s) in the ring moiety, C6-C20-heteroaryl, C1-C20-haloalkyl, —SiR"$_3$, —OSiR"$_3$, —SR", —PR"$_2$ or —NR"$_2$, each R" is independently a hydrogen or hydrocarbyl, e.g. C1-C20-alkyl, C2-C20-alkenyl, C2-C20-alkynyl, C3-C12-cycloalkyl or C6-C20-aryl; or e.g. in case of —NR"$_2$, the two substituents R" can form a ring, e.g. five- or six-membered ring, together with the nitrogen atom wherein they are attached to; Cp is preferably cyclopentadienyl, indenyl, tetrahydroindenyl or fluorenyl, optionally substituted as defined above and may further bear a fused ring of 3 to 7 atoms, e.g. 4, 5 or 6, which ring may be aromatic or partially saturated;

R is a bridge of 1-7 atoms, e.g. a bridge of 1-4 C-atoms and 0-4 heteroatoms, wherein the heteroatom(s) can be e.g. Si, Ge and/or O atom(s), whereby each of the bridge atoms may bear independently substituents, such as C1-C20-alkyl, tri(C1-C20-alkyl)silyl, tri(C1-C20-alkyl)siloxy or C6-C20-aryl substituents); or a bridge of 1-3, e.g. one or two, hetero atoms, such as silicon, germanium and/or oxygen atom(s), e.g. —SiR$^1_2$—, wherein each R$^1$ is independently C1-C20-alkyl, C6-C20-aryl or tri(C1-C20-alkyl)silyl- residue, such as trimethylsilyl-;

M is a transition metal of Group 4 to 6, such as Group 4, e.g. Ti, Zr or Hf;

each X is independently a σ-ligand, such as H, halogen, C1-C20-alkyl, C1-C20-alkoxy, C2-C20-alkenyl, C2-C20-alkynyl, C3-C12-cycloalkyl, C6-C20-aryl, C6-C20-aryloxy, C7-C20-arylalkyl, C7-C20-arylalkenyl, —SR", —PR"$_3$, —SiR"$_3$, —OSiR"$_3$ or —NR"$_2$; each R" is independently hydrogen or hydrocarbyl, e.g. C1-C20-alkyl, C2-C20-alkenyl, C2-C20-alkynyl, C3-C12-cycloalkyl or C6-C20-aryl; or e.g. in case of —NR"$_2$, the two substituents R" can form a ring, e.g. five- or six-membered ring, together with the nitrogen atom wherein they are attached to;

each of the above mentioned ring moiety alone or as a part of a moiety as the substituent for Cp, X, R" or R$^1$ can further be substituted e.g. with C1-C20-alkyl which may contain Si and/or O atoms; and n is 0 or 1; m is 1, 2 or 3, e.g. 1 or 2; q is 1, 2 or 3, e.g. 2 or 3; m+q is equal to the valency of M.

In a suitable subgroup of the compounds of formula (II) each Cp independently bears one or more substituents selected from C1-C20-alkyl, C6-C20-aryl, C7-C20-arylalkyl (wherein the aryl ring alone or as a part of a further moiety may further be substituted as indicated above), —OSiR"$_3$, wherein R" is as indicated above, preferably C1-C20-alkyl; X is as H, halogen, C1-C20-alkyl, C1-C20-alkoxy, C6-C20-aryl, C7-C20-arylalkenyl or —NR"$_2$ as defined above, e.g. —N(C1-C20-alkyl)$_2$; R is a methylene, ethylene or a silyl bridge, whereby the silyl can be substituted as defined above, e.g. a dimethylsilyl-, methylphenylsilyl- or trimethylsilylmethylsilyl-bridge; n is 0 or 1; m is 2 and q is two. Preferably, R" is other than hydrogen.

A specific subgroup includes the well known metallocenes of Zr, Hf and Ti with one or two, e.g. two, $\eta^5$-ligands which may be bridged or unbridged cyclopentadienyl ligands optionally substituted with e.g. siloxy, alkyl and/or aryl as defined above, or with two unbridged or bridged indenyl ligands optionally substituted in any of the ring moieties with e.g. siloxy, alkyl and/or aryl as defined above, e.g. at 2-, 3-, 4- and/or 7-positions. As specific examples e.g. bis(alkylcyclopentadienyl)Zr (or Ti or Hf) dihalogenides can be mentioned, such as bis(n-butylcyclopentadienyl)ZrCl$_2$ and bis(n-butylcyclopentadienyl)HfCl$_2$, see e.g. EP-A-129368. Examples of compounds wherein the metal atom bears a —NR"$_2$ ligand are disclosed i.a. in WO-A-9856831 and WO-A-0034341. The contents of the above documents are incorporated herein by reference. Further metallocenes are described e.g. in EP-A-260130. As further examples of usable metallocenes may also be found e.g. from WO-A-9728170, WO-A-9846616, WO-A-9849208, WO-A-9912981, WO-A-9919335, WO-A-9856831, WO-A-00/34341, EP-A-423101 and EP-A-537130 as well as V. C. Gibson et al., in Angew. Chem. Int. Ed., engl., vol 38, 1999, pp 428-447, the disclosures of which are incorporated herein by reference.

Alternatively, in a further subgroup of the metallocene compounds, the metal bears a Cp group as defined above and additionally a $\eta^1$- or $\eta^2$-ligand, wherein said ligands may or may not be bridged to each other. This subgroup includes so called "scorpionate compounds" (with constrained geometry) in which the metal is complexed by a $\eta^5$-ligand bridged to a $\eta^1$- or $\eta^2$-ligand, preferably $\eta^1$ (for example a σ-bonded) ligand, e.g. a metal complex of a Cp group as defined above, e.g. a cyclopentadienyl group, which bears, via a bridge member, an acyclic or cyclic group containing at least one heteroatom, e.g. —NR"$_2$ as defined above. Such compounds are described e.g. in WO-A-9613529, the contents of which are incorporated herein by reference.

Any alkyl, alkenyl or alkynyl residue referred above alone or as a part of a moiety may be linear or branched, and contain preferably of up to 9, e.g. of up to 6, carbon atoms. Aryl is preferably phenyl or naphthalene. Halogen means F, Cl, Br or I, preferably Cl.

Said metallocenes (II) and their preparation are well known in the art.

According to an embodiment of SSC particles preferred here, another subgroup of the organotransition metal compounds of formula I usable in the present invention is known as non-metallocenes wherein the transition metal (preferably a Group 4 to 6 transition metal, suitably Ti, Zr or Hf) has a coordination ligand other than cyclopentadienyl ligand.

The term "non-metallocene" herein means compounds, which bear no cyclopentadienyl ligands or fused derivatives thereof, but one or more non-cyclopentadienyl η- or σ-, mono-, bi- or multidentate ligand. Such ligands can be chosen e.g. from (a) acyclic, $\eta^1$- to $\eta^4$- or $\eta^6$-ligands composed of atoms from Groups 13 to 16 of the Periodic Table (IUPAC), e.g. an acyclic pentadienyl ligand wherein the chain consists of carbon atoms and optionally one or more heteroatoms from Groups 13 to 16 (IUPAC), and in which the open chain ligand may be fused with one or two, preferably two, aromatic or non-aromatic rings and/or bear further substituents (see e.g. WO 01 70395, WO 97 10248 and WO 99 41290), or (b) cyclic σ-, $\eta^1$- to $\eta^4$- or $\eta^6$-, mono-, bi- or multidentate ligands composed of unsubstituted or substituted mono-, bi- or multicyclic ring systems, e.g. aromatic or non-aromatic or partially saturated ring systems, containing carbon ring atoms and optionally one or more heteroatoms selected from Groups 15 and 16 of the Periodic Table (IUPAC) (see e.g. WO 99 10353). Bi- or multidentate ring systems include also bridged ring systems wherein each ring is linked via a bridging group, e.g. via an atom from Groups 15 or 16 of the Periodic Table, e.g. N, O or S, to the transition metal atom (see e.g. WO 02 060963). As examples of such compounds, i.a. transition metal complexes with nitrogen-based, cyclic or acyclic aliphatic or aromatic ligands, e.g. such as those described in the applicant's earlier application WO-A-9910353 or in the Review of V. C. Gibson at al., in Angew. Chem. Int. Ed., engl., vol 38, 1999, pp 428-447 or with oxygen-based ligands, such as Group 4 metal complexes bearing bidentate cyclic or acyclic aliphatic or aromatic alkoxide ligands, e.g. optionally substituted, bridged bisphenolic ligands (see i.a. the above review of Gibson et al.). Further specific examples of non-$\eta^5$ ligands are amides, amide-diphosphane, amidinato, aminopyridinate, benzamidinate, azacycloalkenyl, such as triazabicycloalkenyl, allyl, beta-diketimate and aryloxide. The disclosures of the above documents are incorporated herein by reference.

It should be noted that the diversity of the transition metal compound contained in said catalyst particles does not affect the applicability of the process of the invention, whose essential particle-shaping measures remain unaffected by the particular content of the particles to be shaped and slurried in the fluidic isolation medium.

In the catalyst preparation the reaction medium used as solvent may be employed to form the solution of the catalyst component(s). Said solvent is chosen so that it dissolves said catalyst component(s). The solvent can be preferably an organic solvent such as used in the field, comprising an optionally substituted hydrocarbon such as linear or branched aliphatic, alicyclic or aromatic hydrocarbon, such as a linear or cyclic alkane or alkene, an aromatic hydrocarbon and/or a halogen containing hydrocarbon or a mixture thereof. Examples of aromatic hydrocarbons are toluene, benzene, ethylbenzene, propylbenzene, butylbenzene and xylene. Toluene is a preferred solvent. The solution may comprise one or more solvents.

In another embodiment, the solvent consists partly or completely of a liquid monomer, e.g. liquid olefin monomer designed to be polymerised in a "prepolymerisation" immobilisation step.

In still another embodiment of the invention said solvent forming the continuous phase is an inert solvent and includes halogenated organic solvents, particularly fluorinated organic solvents, preferably semi, highly or perfluorinated organic solvents and functionalised derivatives thereof, which means that said solvents may contain other functional groups and/or further halogens such as chlorine.

Examples of the above-mentioned solvents are semi, highly or perfluorinated (a) hydrocarbons, such as alkanes, alkenes and cycloalkanes, (b) ethers, e.g. perfluorinated ethers and (c) amines, particularly tertiary amines, and functionalised derivatives thereof. Preferred are perfluorohydrocarbons of e.g. C3-C30, such as C4-C10. Specific examples of suitable perfluoroalkanes and -cycloalkanes include perfluorohexane, -heptane, -octane and -(methylcyclohexane).

Semi fluorinated hydrocarbons relates particularly to semifluorinated n-alkanes, such as perfluoroalkyl-alkane.

"Semi fluorinated" hydrocarbons also include such hydrocarbons wherein blocks of —C—F and —C—H alternate. "Highly fluorinated" means that the majority of the —C—H units are replaced with —C—F units. "Perfluorinated" means that all —C—H units are replaced with —C—F units. In this respect, it is referred to the articles of A. Enders and G. Maas in "Chemie in unserer Zeit", 34. Jahrg. 2000, Nr. 6, and of Pierandrea Lo Nostro in "Advances in Colloid and Interface Science", 56 (1995) 245-287, Elsevier Science.

The fluorinated solvents are particularly preferred as they are unpolar, hydrophobic and have very limited miscibility with common organic solvents in certain temperature ranges.

Furthermore, these fluorinated solvents are chemically very inert and are very poor solvents for polar compounds such as catalytically active compounds and precursors or reaction products thereof.

In all the embodiments of a process for preparing said catalyst particles, the resulting particles from the dispersed phase of the emulsion are of a size, shape (spherical) and uniformity which render the ultimate catalyst component extremely effective in olefin polymerisation. However, a lot of these good properties can easily be destroyed during the drying step. But now, according to the invention, this critical step can be totally avoided and thus keep or even still improve the excellent properties of the ZN or SSC catalysts prepared by the emulsion method described in detail above.

After the formation of the particles and the optional washing procedure, the excess of the immiscible solvent or washing media can be removed by decanting, preferably e.g. by using a dip pipe, or by any other appropriate method known in the art. However, it should be pointed out that according to the method of the invention, solvent or washing media remained in the catalyst slurry will not be removed from the slurry by heating or drying. A great advantage achieved by this procedure, is that all these steps can be carried out in the same process device, i.e. there is no need for a large number of devices or apparatus, which decreases the process time, costs and also yield.

The washing medium is preferably removed to an extent as much as possible, which is easily possible by using e.g. a dip pipe as disclosed above. The remaining medium protects the catalyst particles from undesirable agglomeration and/or fines formation. The solvent and/or the washing medium are removed to an extent of more than about 50%. Preferably about 30-50% of the volume being initially present in the respective method step will be left in the catalyst slurry meaning that about up to 70% of the medium is removed. The fluidic isolation medium, which is to be added into the mixture in the next step, has to be miscible with the still present immiscible solvent and/or washing medium in order to avoid the formation of a two phase system, which would cause troubles in homogeneity.

The washing medium used in the washing step is a linear or branched, optionally substituted aliphatic hydrocarbon having 4 to 12 carbon atoms or optionally substituted aromatic hydrocarbon having 6 to 12 carbon atoms. One additional alternative for washing medium is the isolation medium itself, which can be used alone or as washing medium in one or more washings.

The solid catalyst particles are washed at least once, preferably at least twice, most preferably at least three times with a hydrocarbon, which preferably is selected from aromatic and aliphatic hydrocarbons, preferably with toluene, particularly with hot (e.g. 90° C.) toluene, which might include a small amount, preferably a few vol-%, such as about 3-7 vol-%, preferably about 4-6 vol-%, more preferably about 5 vol-% of $TiCl_4$ in it. A further wash is advantageously performed with heptane, most preferably with hot (e.g. 90° C.) heptane, and yet a further wash with pentane. A washing step typically includes several substeps. A favoured washing sequence is, for example, one wash with toluene at about 90° C., 2-4 washes with heptane at about 90° C. or two washes with heptane and one or two washes with pentane at room temperature. As disclosed above one or more washes can be carried out by using the fluidic isolation medium.

According to the present invention the fluidic isolation medium is transferred into the reaction device after removing the immiscible solvent and/or the washing medium from the reaction device, in an amount, which is sufficient to form a catalyst-isolation medium slurry leading to a stable storable catalyst particle composition.

According to the present invention, the fluidic isolation medium has to be inert under the reaction conditions so as to not influence or react with the prepared catalyst particles and/or not affect the polymerisation reaction itself. Furthermore, it should be miscible with the solvent and/or the washing medium under the reaction conditions.

Mixing of the catalyst with the isolation medium should be done in respect of time and rate sufficient in order to get desirable distribution of the solid catalyst particles in the fluidic isolation medium. Mixing time and rate are naturally dependent on the mixing device and on the amount of the catalyst to be slurried with the isolation medium.

Accordingly, the process of the invention is a smooth way to prepare and isolate the catalyst particles, which leads to improved morphology and activity of the catalyst.

The fluidic isolation medium has to be an organic liquid, preferably an oil, petroleum or a hydrocarbon solvent oil mixture. Thus, e.g. silicon oils can not be used in the present invention.

Said oil is selected from the group consisting of hydrocarbon oils, preferably of white oils, which are mixtures of paraffinic and naphthenic hydrocarbons. Such oils are white or essentially colorless, odorless and tasteless and have a high degree of chemical and thermal stability. The viscosity of such oils used in the present invention is $\leq 500$ cSt (40° C.), preferably 300 cSt (40° C.) or below and more preferably 200 cSt (40° C.) or below. Many white oils, most preferably used in the present invention have a viscosity below 150 cSt (40° C.), or even below 100 cSt (40° C.), e.g. between 60 to 80 cSt (40° C.) (measured according to ASTM D 445). Such paraffinic white oils do not pose a risk to health, and are not considered hazardous, which properties make them easy to handle and transport.

The fluidic isolation medium can be well added in step (d) at room temperature.

After adding the fluidic isolation medium, and stirring the mixture the oil is distributed all around the catalyst particles.

After the mixing of the catalyst-isolation medium-slurry the product can also be taken out of the reaction vessel and transferred into a storage container. Although during transport and storage settling of the catalyst particles can occur, the isolation medium is still protecting the catalyst during storage against morphology damages and activity losses during storage. By using the isolation medium less agglomerates and fines are produced in the final catalyst product. Therefore, advantage of the new method over the prior art is a much more simplified and careful catalyst isolation from the reaction vessel.

The storage and/or transport containers can be every known containers which does not react with the catalyst-slurry and which has a good storage and or transport stability.

For transport safety cost saving purposes it is preferable that oil/solvent mixture in the catalyst transport container contains more than 50% of oil.

The finally obtained catalyst component in the isolation medium is desirable in the form of particles having an average size range of 5 to 200 μm, preferably 10 to 100 μm, most preferably 20 to 50 μm.

As explained above in more detail, the present invention provides a method for isolating emulsion catalyst (ZN and SSC for PP and PE) from the washing media by use of an isolation media instead of a drying step in the preparation process. As a consequence, the catalyst yield is increased in the preparation process, while less catalyst is left inside the reactor after preparation and the catalyst can not longer tend to stick in the catalyst dryer. Thus, catalyst losses can be avoided, according to the method of the invention.

Furthermore, a significantly shortening of catalyst preparation time can be achieved, i.e. in some cases up to 50% compared to the commonly used methods due to a much more simplified catalyst isolation. Said shortening of production time as well as the fact that all catalyst preparation process steps can be carried out in same process device lead to a decrease of preparation costs. Therefore, this new method is also important in view of economically reasons.

The so prepared catalyst-slurry can be used in this form in the polymerisation reaction as such or is ready for catalyst wax preparation. Furthermore, a continuous addition of the catalyst-slurry into the reaction device can improve a constant and homogenous polymerisation of the respective monomers, i.e. a saw teeth pattern of the activity of the catalyst in the polymerisation reactor can be avoided.

According to the present invention a method for polymerising olefins, in particular $C_2$ to $C_{10}$ α-olefins, preferably propylene or ethylene optionally with other α-olefins as co-monomers is contemplated herein.

The invention is explained in more detail as follows. Some preferred embodiments of the invention are described by way of illustration in the following Examples.

In said Examples, Examples 1 and 2 make use of a method according to the present invention. Examples 3 and 4 are Comparative Examples, using the method according to WO03/000754 and European Patent Application No. 01660238.5.

EXAMPLES

The compounds as used in the Examples are as follows:
Viscoplex 1-254: Tradename for a 40-44% of acrylic polymer in base oil, used as emulsion stabilizer.
Necad 547: Polydecene, produced by Fortum, used as turbulence minimising agent.
White oil (Primol 352): Tradename for paraffinic base oil product of Statoil, viscosity 70.0 cSt (40° C., ASTM D 445),

Example 1

A ZN-type catalyst was prepared according to the method described in WO03/000754, example 6, however, the amounts being up-scaled to bigger amounts. The Mg-complex was prepared according to example 1 of WO03/000754.

After settling and siphoning the solids underwent washing with (1) 45 kg toluene and (2) four times with 25 kg heptane. After each wash the mixture is allowed to settle for 30 minutes. The reactor was pressured on 2 bar and the excess of the washing medium was carefully let out through the dip pipe so as to maintain the catalyst inside of the reactor. Then 3-7 liters of white oil was added into the reactor. The obtained catalyst-oil-slurry was mixed for 10 minutes before the product was taken out and transferred into a storage container.

Details and results are disclosed in Table 1.

Example 2

The procedure of Example 1 was repeated with a change in catalyst reaction time (one hour longer).

Comparative Examples 3 and 4

The procedure of Example 1 was repeated with some changes in raw material concentration, reaction times and washing procedure and in isolation method, as indicated in Table 1 below.

It can be seen from these examples that the method according to the present invention significantly increases the total yield of the catalyst component, as well as significantly decreases the production time and accordingly the production costs.

TABLE 1

| Catalyst batch | Unit | Example 1 | Example 2 | Comp. Example 3 | Comp. Example 4 |
|---|---|---|---|---|---|
| Raw materials | | | | | |
| heptane | Vol.-% | 15.0 | 15.0 | 16.3 | 15.8 |
| Necadd 547 | ppm | 16.5 | 16.5 | 10.0 | 8.6 |
| Viscoplex 1-254 | Vol.-% | 2.1 | 2.1 | 2.3 | 2.2 |
| Reaction | | | | | |
| Settling | min | 20 | 20 | — | — |
| Washing | | | | | |
| toluene | kg | 45 | 45 | 40 | 40 |
| heptane | kg | 30 | 30 | 25 | 25 |
| heptane | kg | 30 | 30 | 25 | 25 |
| heptane | kg | 30 | 30 | — | — |
| heptane | kg | 30 | 30 | — | — |
| pentane | kg | — | — | 5 | 5 |
| Isolation | | | | | |
| Drying time | min | — | — | 200 | 195 |
| Drying method | | — | — | N2 Flow | Vacuum |
| Isolation method | | Oil | Oil | Dry | Dry |
| Production time | h | 11 | 12 | 16.5 | 15.5 |
| Catalyst | | | | | |
| Cat-Yield | kg | 2.77 | 2.94 | 1.9 | 0.8 |
| Act. | kg/gcat* | 22.84 | 24.87 | ??? | 21.1 |
| PS mode[1] | μm | 41.670 | 37.96 | 31.50 | 26.14 |
| Span[2] | | 1.74 | 1.46 | 10.33 | 6.13 |

[1]PS mode: Radius of the particle size giving the peak maximum in the particle size distribution curve. Measured by Coulter Counter LS 200 at room temperature with n-heptane as medium.
[2]Span: $(PD_{90\%}) - (PD_{10\%})/PD_{50\%}$ ($PD_{nn\%}$ = Particle diameter at nn% cumulative size)

The invention claimed is:

1. A method for preparing a storable fluidic olefin polymerization catalyst composition, said catalyst comprising an organometallic compound of a transition metal of Group 3 to 10 of the Periodic Table (IUPAC), or of an actinide or lanthanide, said method comprising:

(a) forming a liquid/liquid emulsion system, which contains a homogeneous solution of a catalyst system, said solution being dispersed in an immiscible liquid and forming the dispersed phase of the liquid/liquid emulsion system, (b) solidifying said dispersed droplets to form solid catalyst particles having a predetermined size range, (c) removing the immiscible liquid from the reaction mixture in order to obtain said solid catalyst particles;

(d) adding a fluidic isolation medium to the solid catalyst particles, said isolation medium being inert with respect to the catalyst particles and under the conditions of the olefin polymerization, and stirring the mixture, to obtain a storable fluidic olefin polymerization catalyst composition;

wherein the step of drying the catalyst particles is avoided.

2. The method according to claim 1, said method further comprising a turbulence minimizing agent (TMA) which is added to the reaction mixture before solidifying said droplets of the dispersed phase, said TMA being inert and soluble in the reaction mixture under the reaction conditions.

3. The method according to claim 1, said method further comprising transferring the resulting mixture obtained in step (d) to a storage container.

4. The method according to claim 1, wherein the solid catalyst particles are treated with a washing medium before adding the fluidic isolation medium in step (d).

5. The method according to claim 4, wherein the washing medium is a linear or branched, optionally substituted aliphatic hydrocarbon having 4 to 12 carbon atoms or optionally substituted aromatic hydrocarbon having 6 to 12 carbon atoms.

6. The method according to claim 4, wherein the fluidic isolation medium is used as washing medium, in one or more washing steps.

7. The method according to claim 1, wherein said fluidic isolation medium is an organic liquid.

8. The method according to claim 1, wherein the fluidic isolation medium is miscible with the washing medium.

9. The method according to claim 1, wherein the viscosity of the fluidic isolation medium is below 500 cSt at 40° C.

10. The method according to claim 1, wherein said solvent for the homogeneous solution of a catalyst system is selected from a linear, branched, or cyclic alkane or alkene, an aromatic hydrocarbon and/or a halogen-containing hydrocarbon, or a mixture thereof.

11. The method according to claim 1, wherein said immiscible liquid which forms the continuous phase is an inert solvent or a mixture thereof.

12. The method according to claim 1, wherein said immiscible liquid which forms the continuous phase comprises a fluorinated organic solvent, a functionalized derivative thereof, or a mixture thereof.

13. The method according to claim 1, wherein said immiscible liquid comprises a fluorinated hydrocarbon, a functionalized derivative thereof, or a mixture thereof.

14. The method according to claim 13, wherein said immiscible liquid comprises a semi-, highly or perfluorinated hydrocarbon, a functionalized derivative thereof, or a mixture thereof.

15. The method according to claim 14, wherein said immiscible liquid comprises a perfluorohydrocarbon or a functionalized derivative thereof.

16. The method according to claim 1, wherein the transition metal compound is of Group 4 to 6 of the Periodic Table (IUPAC).

17. The method according to claim 1, wherein the transition metal compound is a compound of formula (I):

$$(L)_m R_n MX_q \qquad (I)$$

wherein M is a transition metal as defined in claim 18 and each X is independently a σ-ligand, each L is independently an organic ligand which coordinates to M, R is a bridging group linking two ligands L, m is 1, 2 or 3, n is 0 or 1, q is 1, 2 or 3, and m+q is equal to the valency of the metal.

18. The method according to claim 17, wherein the transition metal compound is a metallocene.

19. The method according to claim 17, wherein the transition metal compound is a non-metallocene.

20. The method according to claim 1, wherein the catalyst is a Ziegler-Natta type catalyst.

21. The method according to claim 1, wherein the steps a) and b) further comprise:

i) preparing a solution of a complex of a Group 2 metal and an electron donor by reacting a compound of said metal with said electron donor or a precursor thereof in an organic liquid reaction medium;

ii) reacting said complex, in solution, with a compound of a transition metal to produce an emulsion the dispersed phase of which contains more than 50 mol % of the Group 2 metal in said complex;

iii) maintaining the particles of said dispersed phase within the average size range 5 to 200 μm by agitation in the presence of an emulsion stabilizer and solidifying said particles.

22. The method according to claim 1, wherein the fluidic isolation medium is added in step (d) at room temperature.

23. The method according to claim 1, wherein the immiscible liquid and/or the washing medium are separated from the catalyst particles by decanting.

24. The method according to claim 23, wherein more than about 50% of the initial volume of the immiscible liquid and/or the washing medium are removed.

25. The method according to claim 2, wherein the solid catalyst particles are treated with a washing medium before adding the fluidic isolation medium in step (d).

26. The method according to claim 25, wherein the washing medium is a linear or branched, optionally substituted aliphatic hydrocarbon having 4 to 12 carbon atoms or optionally substituted aromatic hydrocarbon having 6 to 12 carbon atoms.

27. The method according to claim 7, wherein said fluidic isolation medium is an oil, petroleum, or a hydrocarbon or mixtures thereof.

28. The method according to claim 27, wherein said oil is a hydrocarbon oil.

29. The method of claim 28, wherein the hydrocarbon oil is a white oil.

30. The method according to claim 19, wherein the viscosity of the fluidic isolation medium is below 300 cSt at 40° C.

31. The method of claim 30, wherein the viscosity of the fluidic isolation medium is below 200 cSt at 40° C.

32. The method of claim 31, wherein the viscosity of the fluidic isolation medium is below 150 cSt at 40° C.

33. The method according to claim 32, wherein the viscosity of the fluidic isolation medium is below 100 cSt at 40° C.

34. The method according to claim 33, wherein the viscosity of the fluidic isolation medium is between 60 and 80 cSt at 40° C.

35. The method according to claim 14, wherein said immiscible liquid comprises a C3-C30 perfluoroalkane, -alkene, or -cycloalkane, or a mixture thereof.

36. The method according to claim 35, wherein said immiscible liquid comprises a C4-C10 perfluoroalkane, -alkene or -cycloalkane, or a mixture thereof.

37. The method according to claim 36, wherein said immiscible liquid comprises a perfluorohexane, perfluoroheptane, perfluorooctane, or perfluoro (methyl-cyclohexane), or a mixture thereof.

38. The method according to claim 20, wherein the steps a) and b) further comprise:
   i) preparing a solution of a complex of a Group 2 metal and an electron donor by reacting a compound of said metal with said electron donor or a precursor thereof in an organic liquid reaction medium;
   ii) reacting said complex, in solution, with a compound of a transition metal to produce an emulsion the dispersed phase of which contains more than 50 mol % of the Group 2 metal in said complex;
   iii) maintaining the particles of said dispersed phase within the average size range 5 to 200 μm by agitation in the presence of an emulsion stabilizer and solidifying said particles.

39. The method according to claim 23, wherein a dip pipe is used to decant the immiscible liquid and/or the washing medium from the catalyst particles.

40. The method according to claim 24, wherein up to 70% of the initial volume of the immiscible liquid and/or the washing medium are removed.

* * * * *

UNITED STATES PATENT AND TRADEMARK OFFICE
CERTIFICATE OF CORRECTION

| | | |
|---|---|---|
| PATENT NO. | : 7,592,285 B2 | Page 1 of 1 |
| APPLICATION NO. | : 10/561016 | |
| DATED | : September 22, 2009 | |
| INVENTOR(S) | : Rekonen et al. | |

It is certified that error appears in the above-identified patent and that said Letters Patent is hereby corrected as shown below:

Column 14, line 2: please delete "claim 18" and insert -- claim 16 --.

Signed and Sealed this

Twenty-sixth Day of January, 2010

David J. Kappos
*Director of the United States Patent and Trademark Office*

UNITED STATES PATENT AND TRADEMARK OFFICE
CERTIFICATE OF CORRECTION

PATENT NO. : 7,592,285 B2  Page 1 of 1
APPLICATION NO. : 10/561016
DATED : September 22, 2009
INVENTOR(S) : Rekonen et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 276 days.

Signed and Sealed this

Twenty-first Day of September, 2010

David J. Kappos
*Director of the United States Patent and Trademark Office*